United States Patent
Dippold et al.

(10) Patent No.: US 9,915,198 B2
(45) Date of Patent: Mar. 13, 2018

(54) BELT PULLEY ARRANGEMENT FOR A BELT DRIVE FOR DRIVING AUXILIARY UNITS OF A MOTOR VEHICLE AND METHOD FOR DRIVING AN AUXILIARY UNIT OF A MOTOR VEHICLE CONNECTED VIA A BELT PULLEY ARRANGEMENT

(71) Applicant: Schaeffler Technologies GmbH & Co. KG, Herzogenaurach (DE)

(72) Inventors: Oliver Dippold, Nuremberg (DE); Vladimir Baranov, Erlangen (DE); Ralf Wagner, Obermichelbach (DE); Bernd Hartmann, Weisendorf (DE); Laszlo Man, Ottersweier-Unzhurst (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 289 days.

(21) Appl. No.: 14/422,076

(22) PCT Filed: Aug. 5, 2013

(86) PCT No.: PCT/DE2013/200096
§ 371 (c)(1),
(2) Date: Feb. 17, 2015

(87) PCT Pub. No.: WO2014/026682
PCT Pub. Date: Feb. 20, 2014

(65) Prior Publication Data
US 2015/0233287 A1    Aug. 20, 2015

(30) Foreign Application Priority Data

Aug. 14, 2012   (DE) .......................... 10 2012 214 486
Sep. 10, 2012   (DE) .......................... 10 2012 215 949

(51) Int. Cl.
*H02K 7/10*      (2006.01)
*H02K 23/60*    (2006.01)
(Continued)

(52) U.S. Cl.
CPC .............. *F02B 67/08* (2013.01); *F02B 67/04* (2013.01); *F16H 55/36* (2013.01); *H02K 7/108* (2013.01);
(Continued)

(58) Field of Classification Search
CPC ............. H02K 5/22; H02K 11/33; H02K 7/10
(Continued)

(56) References Cited

U.S. PATENT DOCUMENTS 3,250,929 A * 5/1966 Maier .................. H02K 11/046
                                                                    310/64
3,735,221 A * 5/1973 Bell ........................ B66C 13/24
                                                                    318/151
(Continued)

FOREIGN PATENT DOCUMENTS

DE           10148961         4/2002
EP            1253319         10/2002
(Continued)

*Primary Examiner* — Jose Gonzalez Quinones
(74) *Attorney, Agent, or Firm* — Volpe and Koenig, P.C.

(57) ABSTRACT

A belt pulley arrangement for a belt drive to drive auxiliary units of a motor vehicle, having a belt pulley for introducing a torque that can be provided via a flexible drive means, an output shaft for driving an auxiliary unit, in particular a cooling water pump, and an electric machine for the transmission of torque between the belt pulley and the output shaft, wherein the electric machine has a rotor connected to the belt pulley and a stator connected to the output shaft. As a result of the power flow between the belt pulley and the output shaft, which can be influenced by the electric machine, it is not necessary to design the auxiliary unit that (Continued)

is attached via the output shaft for the least beneficial operating point, so that the auxiliary unit can be dimensioned smaller and a reduction in the installation space for motor vehicle components, in particular the installation space for auxiliary units of a motor vehicle that can be driven via the belt drive, is made possible.

12 Claims, 2 Drawing Sheets

(51) Int. Cl.
    *H02K 7/20*     (2006.01)
    *F02B 67/08*     (2006.01)
    *F02B 67/04*     (2006.01)
    *F16H 55/36*     (2006.01)
    *H02K 49/08*     (2006.01)
    *H02K 7/108*     (2006.01)
    *H02K 49/02*     (2006.01)
    *H02K 13/00*     (2006.01)

(52) U.S. Cl.
    CPC ........... *H02K 13/003* (2013.01); *H02K 49/02* (2013.01); *H02K 49/08* (2013.01); *Y10T 74/19014* (2015.01)

(58) Field of Classification Search
USPC ..... 310/62, 63, 98, 100, 118, 121, 232, 239, 310/242, 248
See application file for complete search history.

(56) References Cited

U.S. PATENT DOCUMENTS

| | | | | |
|---|---|---|---|---|
| 4,958,712 | A * | 9/1990 | Suganuma | F16D 13/52 192/113.36 |
| 2002/0157413 | A1* | 10/2002 | Iwanami | F04B 27/0895 62/236 |
| 2006/0063638 | A1* | 3/2006 | Vitale | B60K 6/38 477/5 |
| 2008/0020887 | A1 | 1/2008 | Moeller | |
| 2013/0306005 | A1* | 11/2013 | Shutty | F01P 7/164 123/41.47 |

FOREIGN PATENT DOCUMENTS

| | | |
|---|---|---|
| EP | 1120182 | 8/2011 |
| JP | 2008082508 | 4/2008 |
| WO | 2005119023 | 12/2005 |
| WO | 2012028134 | 3/2012 |

\* cited by examiner

BELT PULLEY ARRANGEMENT FOR A BELT DRIVE FOR DRIVING AUXILIARY UNITS OF A MOTOR VEHICLE AND METHOD FOR DRIVING AN AUXILIARY UNIT OF A MOTOR VEHICLE CONNECTED VIA A BELT PULLEY ARRANGEMENT

FIELD OF THE INVENTION

The invention relates to a belt pulley arrangement for a belt drive for driving auxiliary units of a motor vehicle and to a method for driving an auxiliary unit of a motor vehicle connected by means of a belt pulley arrangement, with the aid of which a motor vehicle auxiliary unit, e.g. a cooling water pump, can be driven via a flexible drive means with the aid of a torque supplied by a motor vehicle engine.

DE 101 48 961 A1 has disclosed a belt drive having an input belt pulley for driving auxiliary units, which is connected via a planetary transmission to a crankshaft of the internal combustion engine, wherein various auxiliary units can be driven via output belt pulleys by means of the flexible drive means driven by the belt pulley. In addition, an electric machine is connected to the flexible drive means via another output belt pulley in order to be able to produce electrical energy from the mechanical energy of the flexible drive means in generator mode or to supply an additional torque input into the flexible drive means in motor mode.

There is a continuous need to reduce the installation space for motor vehicle components.

SUMMARY

It is the object of the invention to indicate measures which allow a reduction in the installation space for motor vehicle components, in particular in the installation space for motor vehicle auxiliary units that can be driven by means of a belt drive.

This object is achieved by a belt pulley arrangement and by a method for driving an auxiliary unit of a motor vehicle connected by means of a belt pulley arrangement according to one or more aspects of the invention. Preferred embodiments of the invention are given below and in the claims.

According to the invention, a belt pulley arrangement for a belt drive for driving auxiliary units of a motor vehicle is provided, said arrangement having a belt pulley for introducing a torque that can be provided via a flexible drive means, an output shaft for driving an auxiliary unit, in particular a cooling water pump, and an electric machine for torque transmission between the belt pulley and the output shaft, wherein the electric machine has a rotor connected to the belt pulley and a stator connected to the output shaft.

With the aid of the electric machine formed by the rotor and the stator, the output shaft can be coupled electromagnetically to the belt pulley, making it possible to modify the power flow between the belt pulley and the output shaft by influencing an electric and/or magnetic field formed between the rotor and the stator. It is thereby possible, in particular, to operate the output shaft below a permissible maximum speed, even at a high speed of the belt pulley, and/or to operate it above a minimum speed provided, even at a low speed of the belt pulley. Due to the fact that the power flow between the belt pulley and the output shaft can be influenced by the electric machine, it is not necessary to design the auxiliary unit that is connected via the output shaft for the least advantageous operating point, so that the auxiliary unit can be dimensioned smaller and a reduction in the installation space for motor vehicle components, in particular the installation space for motor vehicle auxiliary units that can be driven via the belt drive, is made possible.

In particular, the electric machine is operated exclusively as an electromechanical converter. The electric machine is fitted as a direct current drive or as an alternating current drive, for example. In particular, the electric machine can be permanently excited or externally excited. In particular, it is possible to design the electric machine as a synchronous machine or an asynchronous machine. The electric and/or magnetic field which forms between the rotor and the stator can be modified by enabling the rotor to be moved axially relative to the stator, for example, allowing a change in the axial extent, by means of which the components of relevance to the transmission of the power flow, in particular permanent magnets and/or windings, of the rotor and the stator are arranged one behind the other in an overlapping manner in a radial direction. In particular, it is possible to move the rotor axially relative to the stator to such an extent that power transmission between the rotor and the stator can be interrupted, e.g. in order to decouple the auxiliary unit connected via the output shaft from the belt drive.

The rotor of the electric machine can rotate at the speed of the belt pulley. Driving of the rotor is accomplished, in particular, by means of the belt pulley via a flexible drive means engaging on the belt pulley. In particular, the flexible drive means is designed as a belt, a flat belt, a V belt, a toothed belt, a poly-V belt, a cable, a chain or the like. With the aid of one or more deflection pulleys, the angle of wrap of the flexible drive means on the belt pulley can be increased and/or a pretension of the flexible drive means can be adjusted. The stator of the electric machine can rotate at the speed of the output shaft. This means that, in normal operation, both the rotor and the stator can rotate, while a speed difference between the rotor and the stator can be increased or reduced by influencing the electromagnetic field between the rotor and the stator, in particular by means of individually adjustable energization of windings of the stator and/or of the rotor, in order, in particular, to be able to regulate a desired rated speed at the output shaft. In particular, the desired rated speed of the output shaft can be variable and can change during operation. For example, a desired volume flow of an auxiliary unit designed as a cooling water pump can be regulated in accordance with the temperature of a motor vehicle component to be cooled by said cooling water pump, allowing the rated speed of the output shaft connected to said cooling water pump to be changed in order to set the desired volume flow. If the auxiliary unit is not to be operated temporarily, provision can be made, for example, to lock the output shaft mechanically or electrically and to prevent power input into the auxiliary unit. Preferably, the rotor can be connected to the belt pulley via a freewheel, in particular a switchable freewheel, and/or the stator can be connected to the output shaft via a freewheel, in particular a switchable freewheel. This makes it possible to interrupt a power flow from the belt pulley to the output shaft for certain operating situations without producing unnecessary reactive power by way of the electric machine or to operate the auxiliary unit in a purely electrical manner, at least briefly, in particular in a start-stop situation, a change-of-mind situation or when starting the motor vehicle engine to drive the motor vehicle. The auxiliary unit is, for example, a cooling water pump, an oil pump, an air conditioning compressor of an air-conditioning system, a fuel pump, a generator, a lubricant pump, a mechanical charger/compressor for charge air compression in the case of forced-induction motor vehicle engines.

In particular, the electric machine is connected to an electrical energy source for accelerating the output shaft and/or to an electrical energy sink for braking the output shaft. The energy source and/or the energy sink can be connected to the windings of the rotor and/or of the stator of the electric machine. In particular, the energy source and the energy sink can be the same component, preferably a chargeable battery (accumulator), e.g. a motor vehicle battery. Preferably, electrical energy previously stored in the energy sink can be used as an energy source for the acceleration of the output shaft. By supplying electrical energy to the electric machine from the energy source and/or withdrawing electrical energy from the electric machine to the energy sink, the absolute value and/or the sign of a speed difference between the speed of the belt pulley and the speed of the output shaft can be selectively varied. When electrical energy is supplied, the output shaft can be accelerated additionally to the speed introduced by the belt pulley, as a result of which the output shaft overruns the belt pulley ("overrunning mode"). When electrical energy is withdrawn, the output shaft can be braked in comparison with the speed introduced by the belt pulley, as a result of which the output shaft rotates more slowly than the belt pulley ("braking mode"). In braking mode, an electric load and/or an electric storage device can preferably be connected to the electric machine. In particular, the electrical impedance of the connected load can be infinite, as a result of which there is essentially no longer any drag torque. In particular, the rated speed of the output shaft can be decoupled from the speed of the belt pulley. In particular, it is possible, by connecting the electric machine to the energy sink, to produce electrical energy for an onboard electrical system of the motor vehicle or for storage of electrical energy ("generator mode") or, in the case of a braking operation on the motor vehicle, to recover part of the braking effort as electrical energy ("recovery").

A switching element is preferably provided for producing coupling of the belt pulley to the output shaft in a manner substantially fixed against relative rotation in the case of a loss of the power flow in the electric machine. This gives a fail-safe function for the auxiliary unit, which allows at least unregulated operation of the auxiliary unit in accordance with the speed of the belt pulley in the case of failure of the onboard system voltage, for example. In this "fail-safe" operating state, there can be purely mechanical coupling of the belt pulley to the output shaft. For example, the switching element is designed as an electromagnet through which current flows which, in the state when current is flowing through, preloads a spring to prevent mechanical coupling of the belt pulley to the output shaft. If the power supply fails, the electromagnet can no longer preload the spring, with the result that the spring relaxes and, in particular, brings about frictional and/or positive coupling of the belt pulley to the output shaft.

As a particularly preferred option, the electric machine has windings, wherein the windings can be short-circuited in the case of a loss of the power flow in the electric machine. As a result, the switching element for producing coupling of the belt pulley to the output shaft in a manner substantially fixed against relative rotation in the case of a loss of the power flow in the electric machine can be designed as an electric circuit which saves installation space and which short-circuits the windings if, for example, a power supply via an onboard electrical system of the motor vehicle fails. An electric current can be induced in the windings, in particular by permanent magnets that can be moved relative to the windings and/or by other energized windings, making it possible to establish electromagnetic coupling between the rotor and the stator. An additional mechanical coupling of the rotor to the stator can preferably be provided.

In particular, the stator has permanent magnets and the rotor has windings, or the stator has windings and the rotor has permanent magnets, wherein the windings are connected via a contactless or contacting electrical contact means, in particular a sliding contact connection, to electric leads for introducing and/or withdrawing electrical energy. Depending on the embodiment and/or intended use, the permanent magnets and windings can be interchanged. In principle, it is possible to provide windings through which current can flow both for the stator and for the rotor, preferably windings which can be controlled individually and independently of one another, to enable a particularly large number of control options to be achieved for the electric machine. If there is either only one electric circuit on the windings, only a single electrical contact means, via the sliding contact connection for example, is required, as a result of which a correspondingly small amount of installation space is required. As a particularly preferred option, a contactless electrical contact means is provided in order to exchange electrical energy between the electric leads and the rotor and/or stator without mechanical rubbing. By means of the electrical contact means, a supply voltage can be applied in order to operate the electric machine and/or influence the electromagnetic field of the electric machine. Here, the energization of the electric machine can be accomplished by means of an interposed electronic circuit which can be connected, on the one hand, to the electric leads and, on the other hand, to the at least one winding. The electronic circuit can, for example, chop or modulate the supply voltage, in particular in the form of pulse wave modulation, and can energize the at least one winding of the electric machine, wherein the energization of the at least one winding can preferably be subject to open-loop and/or closed-loop control by means of the electronic circuit.

The windings are preferably connected to a support, wherein the support is connected to the output shaft or the belt pulley by means of a connecting piece extending in a radial direction, wherein, on the side facing away from the windings, the support has a contact element for transmitting electrical energy, in particular a slip ring of the sliding contact connection. It is furthermore possible to use the output shaft as an input and the belt pulley as an output, with the result that the support and hence the windings can be connected to an input shaft or to an output shaft. The electrical contacting of the windings to the contact element can be accomplished through the material of the support. For example, the contact element, in particular the slip ring, can be riveted to the support, wherein a rivet passing through the material of the support can form and/or allow an electrical contact. By virtue of the radially extending portion of the support, it is possible, with the aid of the connecting piece, to position that part of the support connected to the output shaft or to the belt pulley which supports the contact element or slip ring at a distance from the output shaft or the belt pulley. It is thereby possible to form a receiving pocket between the contact element and the output shaft or the belt pulley, in which pocket spring-loaded brushes can be arranged, for example. In particular, the brushes or other contacting elements can be connected to a fixed holder, which can be inserted on an axial side of the belt pulley into the pocket bounded by the support. In particular, the holder can be connected to a unit housing of the auxiliary unit, wherein the unit housing of the auxiliary unit can preferably project axially into the belt pulley and/or the belt pulley arrangement.

As a particularly preferred option, the belt pulley has a radially outward-facing running surface for connection of the flexible drive means, wherein an electronic circuit for operating the electric machine is arranged radially to the inside of the running surface, substantially at the axial plane of the running surface. The design of the belt pulley for coupling to the flexible drive means gives rise within the running surface of the belt pulley to a cavity which can be used by the electronic circuit. Viewed radially from the outside, the electronic circuit can be covered substantially completely by the running surface. As a result, the electronic circuit can be connected, in particular in a manner fixed against relative rotation, to windings of the electric machine for which the electronic circuit controls the supply and/or discharge of electrical energy. As a result, it is not necessary to provide separate circuit electronics for the operation of the electric machine outside the belt pulley arrangement, requiring connection via sliding contacts or other forms of connection to the electric machine. A construction for the belt pulley arrangement which saves installation space is thereby obtained.

In particular, the belt pulley has a radially outward-facing running surface for connection of the flexible drive means, wherein the rotor and the stator of the electric machine are arranged radially to the inside of the running surface, substantially at the axial plane of the running surface. The design of the belt pulley for coupling to the flexible drive means gives rise within the running surface of the belt pulley to a cavity which can be used by the electric machine. Viewed radially from the outside, the electric machine can be covered substantially completely by the running surface. A construction for the belt pulley arrangement which saves installation space is thereby obtained.

The invention furthermore relates to a use of a belt pulley arrangement, which can be designed and developed as described above, in a belt drive of a motor vehicle for the purpose of taking off some of a torque supplied by a motor vehicle engine for driving the motor vehicle to an auxiliary unit. Due to the fact that the power flow between the belt pulley and the output shaft can be influenced by the electric machine, it is not necessary to design the auxiliary unit that is connected via the output shaft for the least advantageous operating point, so that, by using the belt pulley arrangement for taking off the torque supplied, the auxiliary unit can be dimensioned smaller and a reduction in the installation space for motor vehicle components, in particular the installation space for motor vehicle auxiliary units that can be driven via the belt drive, is made possible.

The invention furthermore relates to a belt drive for driving auxiliary units of a motor vehicle, having an input belt pulley, which can be connected to an engine shaft, in particular a crankshaft, of an internal combustion engine, at least one output belt pulley, which is coupled to the input belt pulley by means of a common flexible drive means and is used to drive the associated auxiliary unit, in particular a cooling water pump, wherein at least one output belt pulley is designed as a belt pulley arrangement, which can be designed and developed as described above. A plurality of output belt pulleys is preferably provided, wherein, in particular, a plurality, preferably all, of the output belt pulleys are designed as a belt pulley arrangement which can be designed and developed as described above. Due to the fact that the power flow between the belt pulley and the output shaft can be influenced by the electric machine, it is not necessary to design the auxiliary unit that is connected via the output shaft for the least advantageous operating point, so that the belt drive enables the auxiliary unit to be dimensioned smaller and a reduction in the installation space for motor vehicle components, in particular the installation space for auxiliary units of a motor vehicle that can be driven via the belt drive, is made possible.

The invention furthermore relates to a method for driving a motor vehicle auxiliary unit connected by means of a belt pulley arrangement, which can be designed and developed as described above, in which method the supply of electrical energy to the electric machine and/or the withdrawal of electrical energy from the electric machine is carried out by the electric machine in accordance with a speed of the belt pulley in order to regulate a rated speed of the output shaft. Due to the fact that the power flow between the belt pulley and the output shaft can be influenced by the electric machine, it is not necessary to design the auxiliary unit that is connected via the output shaft for the least advantageous operating point, so that the auxiliary unit can be dimensioned smaller and a reduction in the installation space for motor vehicle components, in particular the installation space for auxiliary units of a motor vehicle that can be driven via the belt drive, is made possible. Instead, it is possible to design the auxiliary unit for an intended rated speed range and to regulate the intended rated speed range for the respective auxiliary unit by influencing the power flow between the belt pulley and the output shaft. In particular, the method can be designed and developed as explained above with reference to the belt pulley arrangement.

BRIEF DESCRIPTION OF THE DRAWINGS

The invention is explained by way of example below with reference to the attached drawings, wherein the features described below can each represent an aspect of the invention either individually or in combination. In the drawings.

DETAILED DESCRIPTION OF THE PREFERRED EMBODIMENTS

Figure 1:
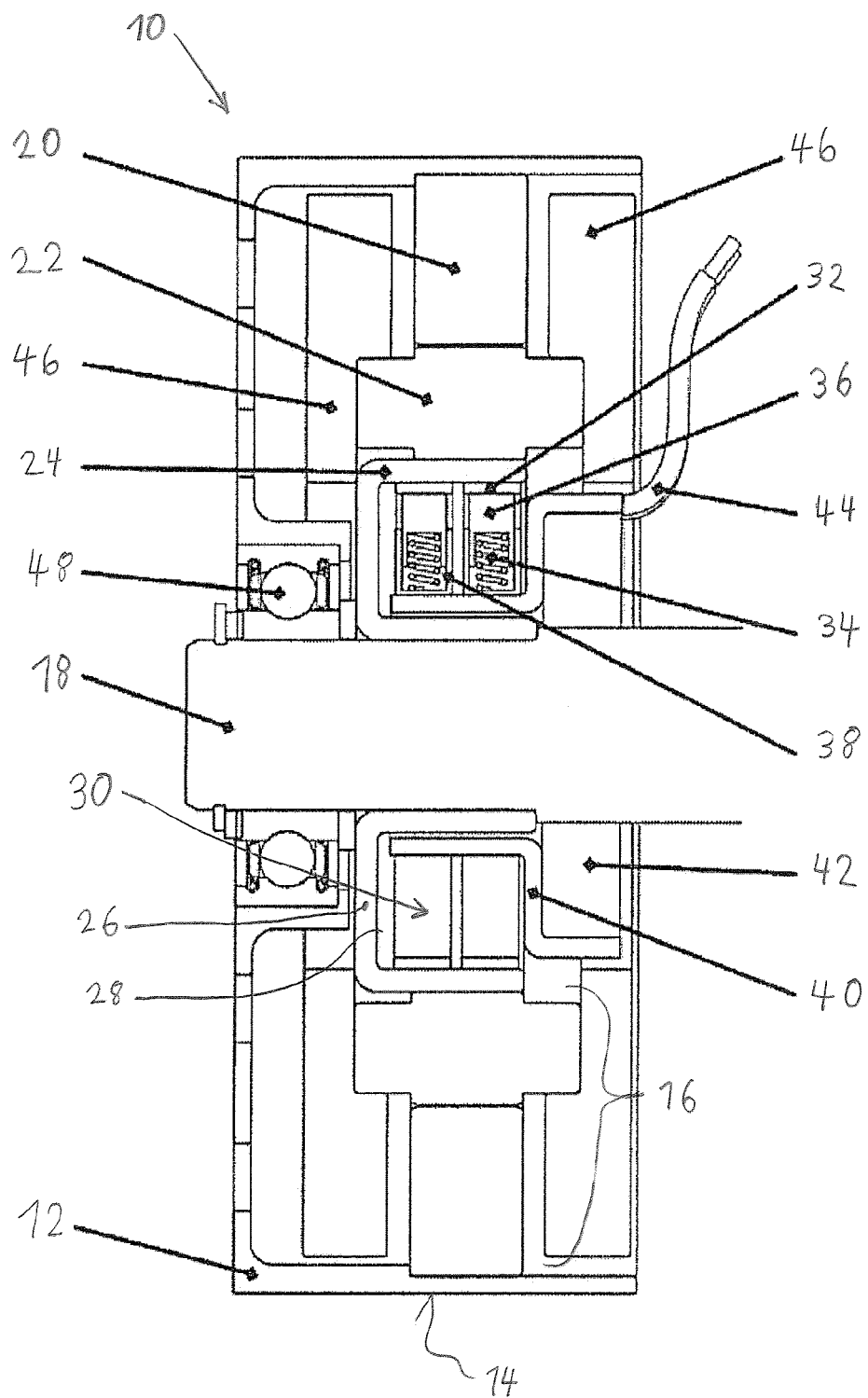
FIG. 1: shows a schematic sectional view of a belt pulley arrangement.

The belt pulley arrangement 10 illustrated in FIG. 1 has a belt pulley 12 with a radially outward-facing running surface 14, via which torque supplied by a crankshaft of an internal combustion engine of a motor vehicle can be introduced by a flexible drive means, e.g. a flat belt. The belt pulley 12 is coupled via an electric machine 16 to an output shaft 18, which can be an input shaft of an auxiliary unit, e.g. a cooling water pump. The electric machine 16 has a rotor 20 firmly connected to the belt pulley 12 and a stator 22 spaced apart from the rotor 20 by means of an air gap. In the illustrative embodiment shown, the rotor 20 has permanent magnets, while the stator 22 has windings. The stator 22 is furthermore firmly connected to the output shaft 18 by means of a support 24. The support 24 is of annular design with a substantially U-shaped, axially open cross section. At the base of the U-shaped cross section, the support 24 has a connecting piece 26 extending in a radial direction, with the result that a pocket 28, in which a sliding contact connection 30 is provided, is formed between the stator 22 and the output shaft 18. On the side facing away from the stator 22, the sliding contact connection 30 has slip rings 32, against which brushes 36, which are spring-loaded by means of compression springs 34, press in order to produce an electrical contact. The compression spring 34 and the brush 36 connected to the compression spring 34 are guided in a brush guide 38. The brush guide 38 is connected to a fixed holder 40. In particular, the holder 40 can be connected to a unit housing 42 of the auxiliary unit, wherein the unit housing 42 can preferably project axially at least partially into the belt pulley 12 and/or the belt pulley arrangement 10. Electric leads 44, which can be electrically connected to the brushes 36, can be passed through the holder 40 and/or the unit housing 42. By means of an electronic circuit 46, which is arranged completely within the belt pulley 12 and, in particular, is attached to the support 24 or to the holder 40 or, in a multi-part design, to the support 24 by means of a first part and to the holder 40 by means of a second part, supply and/or withdrawal of electrical energy via the electric leads 44 can be controlled, thereby making it possible to influence the electromagnetic field between the rotor 20 and the stator 22. As a result, it is possible, in particular, for the speed of the output shaft 18 to differ from the speed of the belt pulley 12, in particular in order to regulate an intended rated speed for the output shaft 18 substantially independently of the speed of the belt pulley 12. To achieve this, the belt pulley 12 is not connected firmly to the output shaft 18 but is supported with the ability for relative rotation by means of a rolling bearing 48.

Figure 2:
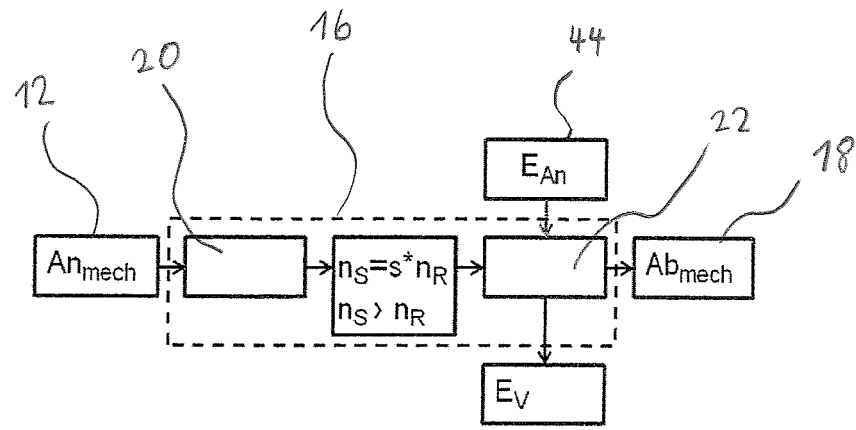
FIG. 2: shows a schematic block diagram of the belt pulley arrangement from FIG. 1 in an overrunning mode.

If, as illustrated in FIG. 2, electrical energy $E_{An}$ is fed into the electric machine 16 via the electric leads 44, the output shaft 18 can be accelerated in addition to the mechanical energy $An_{mech}$ introduced via the belt pulley 12, enabling the stator 22 of the output shaft 18 to rotate at a speed $n_S$ which is greater than the speed $n_R$ of the rotor 20 of the belt pulley 12 by a factor s ("overrunning mode"). A small part of the energies supplied is lost in the form of lost energy $E_V$ and is not transmitted to the output shaft 18, as a result of which the mechanical energy $Ab_{mech}$ output by the output shaft 18 is somewhat lower.

Figure 3:
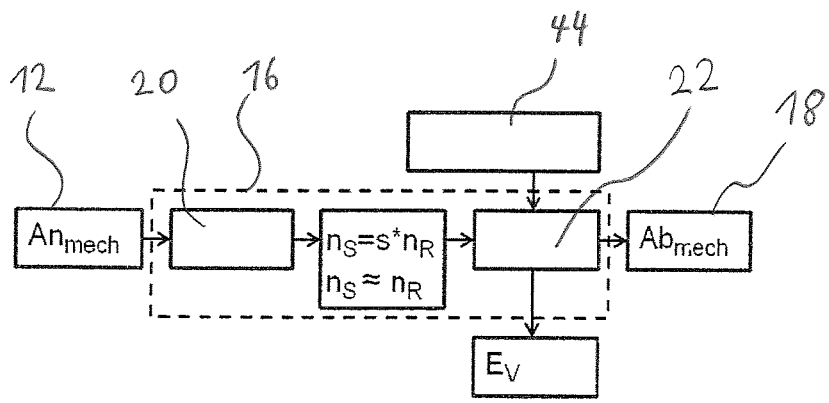
FIG. 3: shows a schematic block diagram of the belt pulley arrangement from FIG. 1 in a fail-safe mode.

If, as illustrated in FIG. 3, electrical energy is neither supplied nor withdrawn via the electric leads 44, the electronic circuit 46 can, in particular, short-circuit the windings of the stator 22, allowing the output shaft 18 to rotate at a speed $n_S$ which substantially corresponds approximately to the speed $n_R$ of the rotor 20 ("fail-safe mode"). A small part of the energies supplied is lost in the form of lost energy $E_V$ and is not transmitted to the output shaft 18, with the result that, allowing for the lost energy $E_V$, the speed $n_S$ of the output shaft 18 is slightly less than the speed $n_R$ of the rotor 20, as a result of which the mechanical energy $Ab_{mech}$ output by the output shaft 18 is somewhat lower. However, the lost energy $E_V$ is generally so small that the factor s is 1 to a good approximation.

Figure 4:
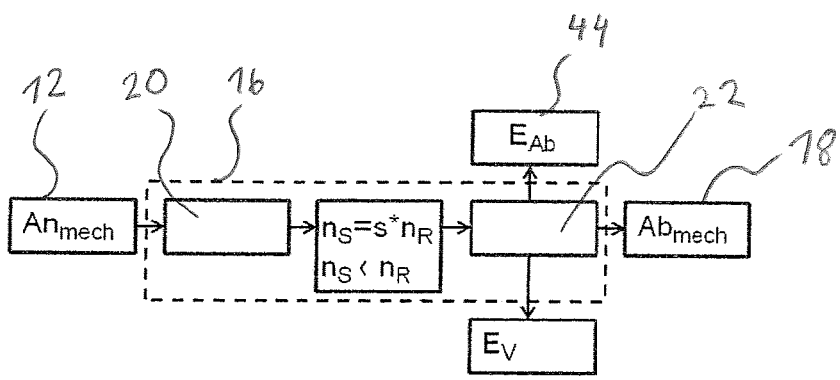
FIG. 4: shows a schematic block diagram of the belt pulley arrangement from FIG. 1 in a braking mode.

If, as illustrated in FIG. 4, electrical energy $E_{Ab}$ is withdrawn from the electric machine 16 via the electric leads 44, in an order, for example, to operate another electric load and/or to store electrical energy produced, the output shaft 18 can be braked in relation to the mechanical energy $An_{mech}$ introduced via the belt pulley 12, allowing the output shaft 18 to rotate at a speed $n_S$ which is less than the speed $n_R$ of the rotor 20 by a factor s ("braking mode"). A small part of the energies supplied by the belt pulley 12 is lost in the form of lost energy $E_V$ and is not transmitted to the output shaft 18 via the electric machine 16, as a result of which the electrical energy $E_{Ab}$ output to the energy sink by the electric machine 16 and the mechanical energy $Ab_{mech}$ output by the output shaft 18 are somewhat lower.

LIST OF REFERENCE SIGNS 10 belt pulley arrangement
12 belt pulley
14 running surface
16 electric machine
18 output shaft
20 rotor
22 stator
24 support
26 connecting piece
28 pocket
30 sliding contact connection
32 slip ring
34 compression spring
36 brush
38 brush guide
40 holder
42 unit housing
44 electric lead
46 electronic circuit
48 rolling bearing
$An_{mech}$ mechanical energy supplied
$Ab_{mech}$ mechanical energy withdrawn
$E_{An}$ electrical energy supplied
$E_{Ab}$ electrical energy withdrawn
$E_V$ lost energy
$n_R$ speed of the rotor
$n_S$ speed of the stator

The invention claimed is:

1. A belt pulley arrangement for a belt drive for driving auxiliary units of a motor vehicle, said arrangement comprising
   a belt pulley for introducing a torque that can be provided via a flexible drive element,
   an output shaft for driving an auxiliary unit,
   an electric machine for torque transmission between the belt pulley and the output shaft, the electric machine has a rotor connected to the belt pulley and a stator connected to the output shaft; and
   a switching element for producing coupling of the belt pulley to the output shaft in a manner substantially fixed against relative rotation in case of a loss of power flow in the electric machine.

2. The belt pulley arrangement as claimed in claim 1, wherein the electric machine is connected to at least one of an electrical energy source for accelerating the output shaft or to an electrical energy sink for braking the output shaft.

3. The belt pulley arrangement as claimed in claim 1, wherein the electric machine has windings, and the windings are short-circuited in case of a loss of power flow in the electric machine.

4. The belt pulley arrangement as claimed in claim 1, wherein the stator has permanent magnets and the rotor has windings, or the stator has windings and the rotor has permanent magnets, and the windings are connected via a contactless or contacting electrical contacts to electric leads for at least one of introducing or withdrawing electrical energy.

5. The belt pulley arrangement as claimed in claim 4, wherein the windings are connected to a support, the support is connected to the output shaft or the belt pulley by a connecting piece extending in a radial direction, and, on a side facing away from the windings, the support has a contact element for transmitting electrical energy.

6. The belt pulley arrangement as claimed in claim 1, wherein the belt pulley has a radially outward-facing running surface for connection of the flexible drive element, and an electronic circuit for operating the electric machine is arranged radially inside of the running surface, substantially at an axial plane of the running surface.

7. The belt pulley arrangement as claimed in claim 1, wherein the belt pulley has a radially outward-facing running surface for connection of the flexible drive element, and the rotor and the stator of the electric machine are arranged radially to the inside of the running surface, substantially at an axial plane of the running surface.

8. A belt drive for driving auxiliary units of a motor vehicle, having an input belt pulley, which is connectable to an engine shaft of an internal combustion engine at least one output belt pulley, which is coupled to the input belt pulley by a common flexible drive element and is used to drive the associated auxiliary unit, and at least one output belt pulley designed as a belt pulley arrangement as claimed in claim 1.

9. A method for driving an auxiliary unit of a motor vehicle which is connected by a belt pulley arrangement as claimed in claim 1, comprising supplying electrical energy to the electric machine or withdrawing electrical energy from the electric machine, or both, depending upon a speed of the belt pulley in order to regulate a rated speed of the output shaft.

10. The belt pulley arrangement of claim 1, wherein the auxiliary units comprise at least one of an air-conditioning compressor, a generator, an oil pump, a lubricant pump, or a fuel pump.

11. The belt pulley arrangement of claim 4, wherein the electrical contact is a sliding contact connection.

12. The belt pulley arrangement of claim 5, wherein the electrical contact is a sliding contact connection, and the contact element of the support is a slip ring of the sliding contact connection.

* * * * *